United States Patent

Allen et al.

[15] 3,681,757

[45] Aug. 1, 1972

[54] SYSTEM FOR UTILIZING DATA STORAGE CHIPS WHICH CONTAIN OPERATING AND NON-OPERATING STORAGE CELLS

[72] Inventors: Charles A. Allen, Poughkeepsie; Stanley R. Andersen, Hopewell Junction; Robert G. Kinkade, Wappingers Falls; Thomas Kwei, Wappingers Falls; Richard H. Robinson, Wappingers Falls, all of N.Y.

[73] Assignee: Cogar Corporation, Wappingers Falls, N.Y.

[22] Filed: June 10, 1970

[21] Appl. No.: 45,116

[52] U.S. Cl. ............ 340/172.5

[51] Int. Cl. ............ G06f 1/00

[58] Field of Search ............ 340/172.5

[56] References Cited

UNITED STATES PATENTS

| | | | |
|---|---|---|---|
| 3,350,690 | 10/1967 | Rice | 340/172.5 |
| 3,422,402 | 1/1969 | Sakalay | 340/172.5 |
| 3,432,812 | 3/1969 | Elfant | 340/172.5 |
| 3,434,116 | 3/1969 | Anacker | 340/172.5 |
| 3,444,526 | 5/1969 | Fletcher | 340/172.5 |
| 3,460,094 | 8/1969 | Pryor | 340/172.5 |

*Primary Examiner*—Harvey E. Springborn
*Attorney*—Harry M. Weiss

[57] ABSTRACT

A system is described in which semiconductor storage chips are tested and sorted into categories based upon the number and location of good operating storage cells. Selected chips of this kind are externally wired to utilize the operable storage cells of each chip.

10 Claims, 3 Drawing Figures

FIG. 2

INVENTORS
CHARLES A. ALLEN
STANLEY R. ANDERSEN
ROBERT G. KINKADE
THOMAS KWEI
RICHARD H. ROBINSON

BY Harry M Weiss
ATTORNEY

READ/WRITE MEMORY

SYSTEM FOR UTILIZING DATA STORAGE CHIPS WHICH CONTAIN OPERATING AND NON-OPERATING STORAGE CELLS

FIELD OF THE INVENTION

This invention generally relates to integrated semiconductor chips and, more particularly to a system for utilizing semiconductor data storage chips which contain operating and non-operating storage cells.

BACKGROUND OF THE INVENTION

Integrated circuit manufacturers have found that the yield in fabricating both complex and densely populated monolithic integrated circuit chips is very low in comparison to manufacturing individual semiconductor active and passive devices. In making individual semiconductor devices, the manufacturing yields generally ranged over 90 percent. However, in fabricating integrated circuits having a number of circuits ranging from several to more than one hundred, the manufacturing yield rate generally dropped according to a corresponding increase in the number of circuits, the amount of devices used for each circuit, and the area of semiconductor material required.

Digital integrated circuits, for computer applications, generally fall into two categories, namely, logic and memory circuits. Both of these types of integrated circuits are becoming more complex and highly sophisticated, requiring a greater number of devices and a correspondingly larger number of circuits. Hence, with the resultant increase in the number of devices and circuits, the manufacturing yield rate dropped to a very low percentage which was substantially below 50 percent. Accordingly, it was discovered that in the manufacture of integrated circuit chips having large numbers of circuits, many of the circuits in each chip proved to be operational, but because all of the circuits of the chip did not function, it could not be used. A need existed to utilize integrated chips having both operable and non-operable circuits. Especially, for monolithic memory integrated circuit chips, a real need existed to use chips having both operable and non-operable storage cells. Hence, a technique was needed to make use of the operable storage cells of a chip containing both operable and non-operable storage cells.

With the present state of integrated circuit technology data storage units or memory cells are manufactured on single chips with, for example, 128 memory locations. This technology offers low cost digital memories if yields are kept sufficiently high. One factor tending to lower yields with increases in memory locations per chip is that one defect in the chip at a single memory location renders the entire chip useless.

BRIEF DESCRIPTION OF THE INVENTION

In accordance with the present invention a storage chip having a plurality of memory cells accessible by a binary coded signal applied to a number of address lines (the address lines are decoded to select word and bit lines) is tested by sequentially accessing each memory cell and checking the digit output from the storage chip. If the storage chip tests indicate that the chip is fully operational (all memory cells are useable), it is sorted into a first group.

If it is found defective, one of the number of address input line means or lines is held at one signal level, for example, a down level, and the tests are repeated, accessing the cells possible with the one address line at the clamped off or down level. If the storage chip test now indicates that it is operational (half of the chip's memory cells are useable) with one address line connected to a down level, it is sorted into a second group.

If the chip is still found to be non-operational, the same address line is held at an up level and the tests are repeated, accessing the cells possible with the one address line at an up or energized level (chips passing these tests are placed in a third group). This testing procedure may be repeated with each of the individual address lines tied to one of the two levels until the storage cell tests operational. When an address line is tied to one of the two levels, this serves to partition the chip into a sub-array from the original array of memory cells arranged in rows and columns on the semiconductor chip. The sub-array includes a plurality of memory cells arranged in rows and columns.

In the event that the above sequence of tests does not produce an operational chip, then the test sequence is repeated using two address lines tied to one of the two levels. If these tests do not indicate the chip to be operational, the test sequence is repeated using more address lines in combination until all address line combinations have been used in this test sequence.

The storage chips sorted into the first group are employed in memory systems in a normal manner since they are fully operational chips. However, if it is desired to utilize storage chips having some operational cells, then those chips which have been sorted into a second or third group are electrically packaged (using chips only of one group i.e., second group or third group) in a memory system such that the one address line which was connected to one of the two levels is now tied to a terminal in the memory system whose voltage level corresponds to the same up or down level used in the test sequence that indicated the chips to have the desired number of operational storage cells. The resulting memory systems utlizing storage chips from either the second or third group will be operational; however, these memory systems contain half the storage cell density of those memory systems utilizing storage chips sorted into the first group which has all storage cells operational.

Similarly, various memory systems can be assembled utilizing storage chips sorted into groups other than the first, second or third groups described above. Accordingly, the memory systems utilizing storage chips that have been sorted into fourth, fifth, etc. groups will contain storage cell densities at the memory system level depending upon the number of address lines that are tied to one of the two voltage levels. Those storage chips having one address line tied to one voltage level and other storage chips having the same address line tied to the other voltage level will be sorted into separate groups (i.e., second and third; fourth and fifth; etc.) but will contain the same equivalent number of operational storage cells (half of the chip's total number of memory cells are useable). Storage chips having the same number of address lines tied to one of the two voltage levels will exhibit the same equivalent number of operational storage cells as those storage chips having the same number of address lines tied to the other of the two voltage levels.

In the cases or examples discussed above, address decoders were located on the storage chip which also contained the storage cells. However, the same principle is applicable to storage chips which either do not have address decoders e.g., storage array chips) or contain partial address decoders (e.g., partially decoded chips). In these types of storage chips, the word lines (the conductor lines that are connected directly to the storage cells) associated with a number of storage cells will be tied or connected to a specific voltage level which will disable all of the storage cells of the word line.

The address input line means or lines are signal lines which are connected to the decoder inputs so as to select word and bit lines and the word and bit lines are connected to associated storage cells of the storage chip.

The principles of this invention can be adapted for use with read/write and read-only semiconductor storage chips. One example of a semiconductor storage chip and the fabrication method therefor is illustrated in U. S. Patent 3,508,209 to Agusta et al. Additionally, combinations of read-only and read/write semiconductor storage chips can be assembled into memory systems in accordance with this invention.

DETAILED DESCRIPTION

Figures 1, 2:
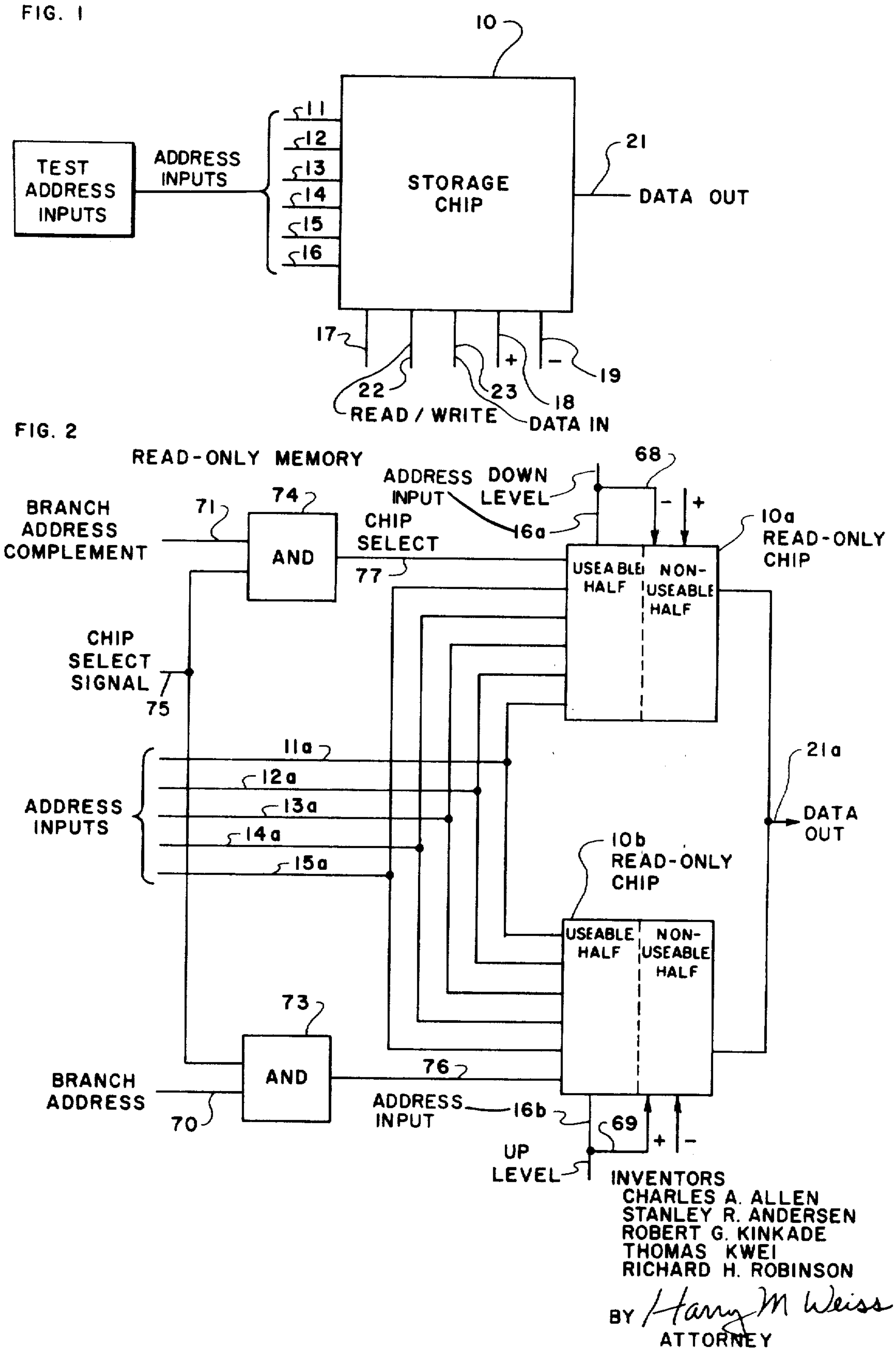
FIG. 1 is a block representation of a storage chip including external terminals which may be employed using this invention.
FIG. 2 is a block diagram of a digital read-only storage system in accordance with the teachings of this invention.

Referring to FIG. 1, a storage chip 10 is shown which has, for this example, 64 memory cells and address decoders organized as 64 words by one bit. Each memory cell can be set to a desired one of two states ("1" or "0"). The storage chip 10 has 6 address input terminals 11-16. In operation, a six bit binary address is applied to the terminals 11-16 to access a particular memory word (in this example; the memory word contains one bit).

A chip select terminal 17 is provided to allow the chip to be electronically enabled or disabled. A disable signal (or the absence of an enable signal) on the chip select terminal 17 prevents energization of the storage chip 10.

The storage chip 10 also has a pair of power supply leads 18 and 19 which have been labeled + and − in this example. It should be clear that the number of power supply leads need not be limited to two.

With the required voltages connected to the leads 18 and 19 and an enable signal applied to the chip select lead 17, a signal level will appear on a data out lead 21 in accordance with information stored at the memory word designated by the six bit binary word present on the address input leads 11–16.

Some storage chips, which serve as read-only memories, are complete as above described since there is only a read only operation performed. If however, the storage chip 10 is to serve as a read/write memory, additional input leads are necessary to write into the memory chip. Accordingly, in FIG. 1, a read/write lead 22 and a data-in lead 23 are shown. When a memory word is selected in a read/write chip, the information stored there can be altered by proper manipulation of the read/write lead 22 while the information to be stored is applied to the data in lead 23.

If the storage chip 10 functions as a read-only chip it is tested by exercising all address inputs 11–16 in all possible combinations of their binary levels while the chip select 17 is at its enable signal level. For each combination of address inputs 11-16, the binary level of the data out line 21 is examined and compared against the predetermined signal level desired for that combination. If the signal level of data out line 21 matches the predetermined pattern for all combinations of input address lines 11–16, the chip is 100 percent good (all storage cells are operational) and it is stored or sorted as a fully operational chip.

If any of the combinations provide data which is not the same as the predetermined test pattern that would be indicative of a fully operational chip, the chip 10 is retested in a similar manner except that the input address line 11 is fixed at its upper signal level. Now, if all output data appearing on Data Out line 21 matches the predetermined pattern which is indicative of a chip having a partial number of operational cells (one of the two halves associated with the address line 11), the chip 10 is stored or sorted as a partially operational chip.

If the output data still does not match the predetermined pattern, the test sequence is repeated with the input address line 11 fixed at its lower signal level. Now, if all output data on the data out line 21 matches the predetermined pattern which is indicative of a chip having a partial number of operational cells (the other of the two halves associated with the address line 11), the chip is stored or sorted as a partially operational chip.

If the test is still negative or data doesn't compare with the predetermined pattern, the test sequence described above for the input address line 11 is repeated with line 11 replaced by lines 12–16, in sequence, and with the chips found to be good at each step separately sorted. Thus 13 separate categories of storage chips are created for this example since 6 address lines are used. Category 1 contains storage chips in which all cells are functioning correctly. Categories 2–13 contain storage chips in which the non-operable cells can be partitioned or segregated into non-used halves of the storage chips by setting one of the six input address lines to either its upper or lower signal level.

Testing of a read/write memory chip is performed similarly to testing of a read-only chip with the exception that data must be stored and read out at each of its two signal levels for each combination of input address lines. The data read out is compared with the data stored to determine whether the chip is functioning properly instead of comparing the data read out with a predetermined pattern as is done in the read-only testing procedure discussed above.

By holding any one address input line in a binary address input word to a fixed (up or down) value, the number of different combinations the six inputs can assume is cut in half. By holding one address input line in one signal state (e.g., down level), a unique half of the available number of operational cells can be selected. By holding the same address input line in the second signal state (e.g., up level), a uniquely different half of the available number of operational cells can be selected. By selecting a second input address line to be held in a particular signal state i.e. up or down level, one half the available (already half of the total number of cells) number of operational cells is again eliminated. In this case (two address input lines tied to an up or down level) however, the number of operational cells available for use are identical to half of the operational cells when the first address input line was held in its fixed signal state.

It is also possible to hold more than one of the input address lines in one of their two signal states thereby partitioning the chip into a smaller number of operational storage cells. For example, if two of the six input address lines 11–16 for the chip 10 are held at a fixed signal level, then one-quarter of the storage cells of the chip are usable as operational storage cells.

If the chip 10 has one or more defective storage cells, it can still be employed as a device having half the number of operational storage cells if all of the non-operational storage cells are in the same half of the chip defined by tying one of the address input terminals 11–16 to a predetermined signal level. By this definition or explanation, there are more than two halves. In fact, there are twelve halves. Since six address lines are used with each address line uniquely dividing the chip into two logical halves, then the use of six address lines provides a total of twelve halves. For a read-write memory chip, isolation of all the non-operating storage cells to any one of the halves of the chip renders the chip usable by tying the appropriate input address terminal to the required signal level.

For read-only memory systems and, if desired, for read-write memory systems, two storage chips having no defects in complementary halves must be employed together to form a read-only (read-write) memory system having a total information pattern equivalent to that stored in a single chip having all storage cells operational.

FIG. 2 shows a pair of read-only storage chips **10*a* and 10*b* which are, for example, in groups two and three which means that the chips contain usable operational cells that number 50 percent of the total storage cells in each storage chip. These chips 10*a* and 10*b* are a memory system having the same number of storage cell locations and are accessible with the same input address signals as a single totally operational chip. A data out line or terminal 21*a* and all address inputs 11a, 12*a*, 13*a* and 14*a* except the ones which must be held in predetermined states are connected in parallel. Address inputs 16*b* and 16*a* are connected to power supply terminals + and –, respectively, by leads 69 and 68. The branch addressing input signal normally applied, if the storage chips 10*a* and 10*b* had the total number of storage cells operational, is applied in true and complement form by leads 70 and 71 as inputs to a pair of "and" gates 73 and 74, respectively. The other inputs to "and" gates 73 and 74 is a select signal 75 so that whenever the signals on leads 70, 75 or 71, 75 are both positive, leads 76 or 77 apply an enable signal to the chip select terminal of storage chips 10*b* or 10*a*. Chip select line 76 or 77 functions in the general chip selection manner to permit information stored in either chip 10*a* or 10*b* to be brought out to the Data Out line 21*a*. The address inputs 11*a*–15*a*** are common to both chips and can not select one of the two chips.

In selecting either chip **10*a* or 10*b*, a signal is applied to lines 71 or 70, respectively, which functions with the select signal supplied to "and" gates 73 and 74 by means of the line 75 to select either the chip 10*a* or 10*b*. Accordingly, the coincident or simultaneous application of two signals to either "and" gate 73 or 74 causes the chip (10*b* or 10*a***) associated with that "and" gate to be selected.

FIG. 2 illustrates an embodiment where half the storage cells of each of the chips **10*a* and 10*b*** are usable. In the event one desires to utilize storage chips where, for example, one quarter of each chip is usable, the following changes would be made: (a) four storage chips would be used; (b) two address lines for each chip would be selectively tied to a down or up level; and (c) additional decode circuitry would be needed using four "and" gates. Similarly, other variations can be made, as desired.

Figure 3:
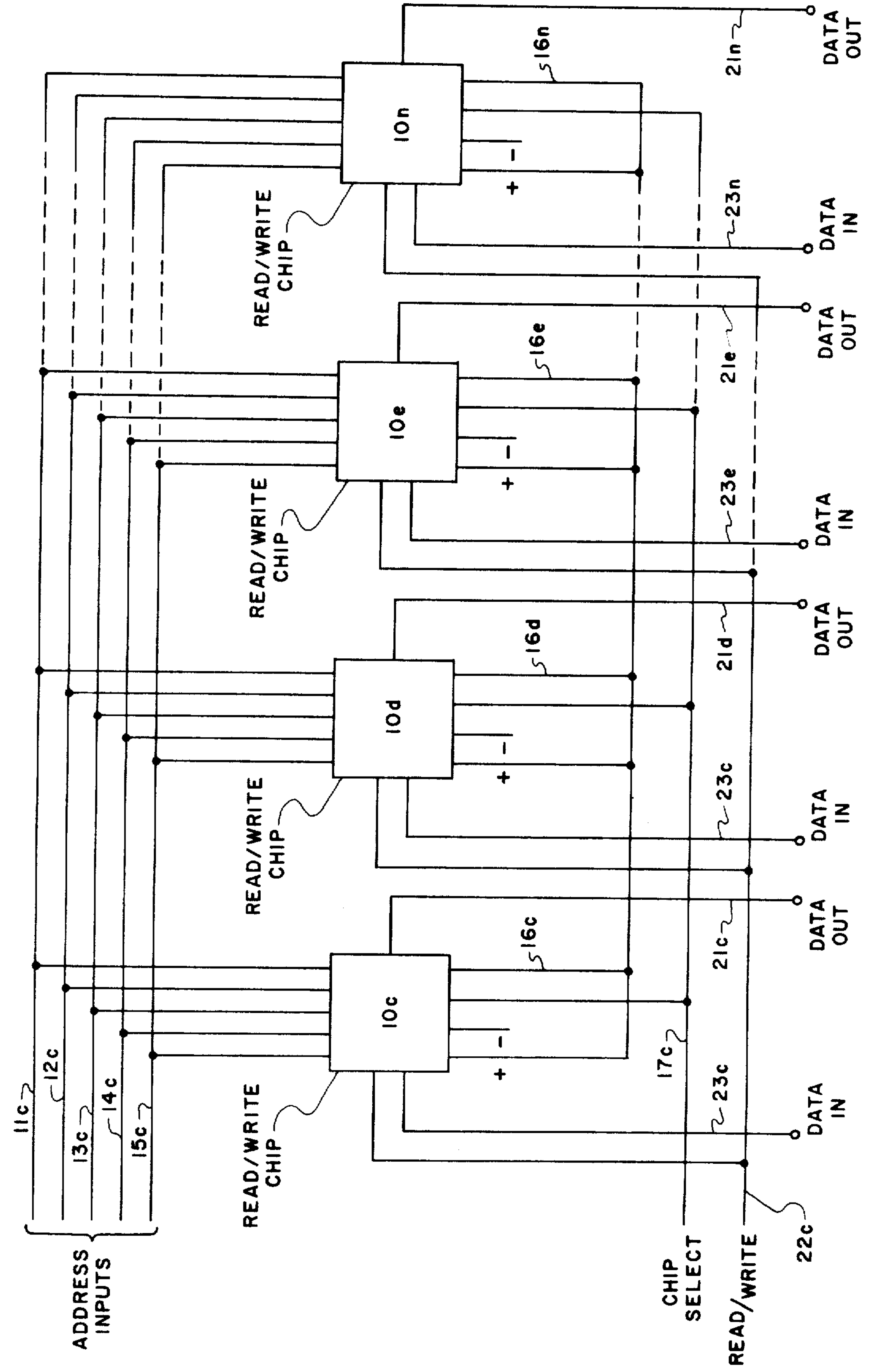
FIG. 3 is a block diagram of a digital read/write storage system in accordance with the teachings of this invention.

FIG. 3 shows a group, **10*c*, 10*d*, 10*e*, . . . 10*n*, of half-good read/write storage chips employed to form a multi-chip memory system. All input signal lines including address inputs, chip select and read/write, are bussed together. Similar reference numerals are used in this figure as were used in FIG. 1 with the addition of a letter c or higher alphabetical letter, as shown. Accessing the chips is performed in a similar manner to normal accessing of 100 percent good storage chips except for the fact that one of the input address lines is held permanently at one of its two signal levels. In this embodiment, each address input line 16*c*, 16*d*, 16*e* . . . 16*n*** is tied to an up or positive signal level. This provides a memory system with the half the number of words that would have been obtained if 100 percent good chips were used. Since all address lines perform the same logical function and are interchangeable, all that is required is to select the proper number of chips from any group (i.e. group 2 or group 3) or combinations of groups (i.e. group 2 and group 3) and connect *n*–1 address lines to *n*–1 terminals, the nth terminal of each chip being connected to the proper signal level where n is the number of address lines for the 100 percent good chip.

It should be evident that the storage chips shown in FIG. 3 can be similarly connected to a down or negative level if those chips had a usable half that required connection in such a manner. Furthermore, in some memory system arrangements, it may be desirable to connect up storage chips (read/write) with some chips connected to one signal level and the remaining chips connected to the other signal level. As indicated above with respect to FIG. 2, any number of storage chips can be interconnected using less than half of the total number of storage cells, i.e., one-fourth, one-eighth, one-sixteenth, etc.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A memory system for using a plurality of storage circuits in an integrated circuit storage chip comprising, in combination, at least one integrated circuit storage chip having a sub-array of usable circuits and another sub-array of non-usable circuits, said another sub-array including at least one non-operating circuit and may include at least one operating circuit interconnected together according to a predetermined interconnection pattern; and selection means for selecting out the portion of said chip containing said sub-array of usable circuits of said chip to perform a memory function from the portion of said chip containing said another sub-array of non-usable circuits, said integrated circuit storage chip comprises a read-only semiconductor memory chip, said selection means comprises at least one memory address input line connected to a selected signal level so as to be continuously energized or clamped off.

2. A memory system for using a plurality of storage circuits in an integrated circuit storage chip comprising, in combination, at least one integrated circuit storage chip having a sub-array of usable circuits and another sub-array of non-usable circuits, said another sub-array including at least one non-operating circuit and may include at least one operating circuit interconnected together according to a predetermined interconnection pattern; and selection means for selecting out the portion of said chip containing said sub-array of usable circuits of said chip to perform a memory function from the portion of said chip containing said another sub-array of non-usable circuits, said integrated circuit storage chip comprises a read/write semiconductor memory chip, said selection means comprises at least one memory address input line connected to a selected signal level so as to be continuously energized or clamped off.

3. A read-only memory system for using a plurality of circuits in integrated circuit read-only memory chips comprising, in combination, a plurality of integrated circuit read-only memory chips, each of said chips having a sub-array of usable circuits and another sub-array of non-usable circuits including at least one non-operating circuit and may include at least one operating circuit interconnected together according to a predetermined pattern; and selection means for selecting out the portion of each of said chips containing said sub-array of usable circuits to perform a read-only memory system function from the portion of each of said chips containing said another sub-array of non-usable circuits, said selection means comprises at least one memory address input line connected to at least one of said plurality of read-only memory chips and a continuously non-energizing signal level; said memory address input line also being connected to at least another of said plurality of read-only memory chips and a continuously energizing signal level.

4. A read-only memory system in accordance with claim 3 including chip selection means for selecting any one of said plurality of read-only memory chips.

5. A read-only memory system in accordance with claim 4 wherein said chip selection means comprises an "and" gate associated with each one of said plurality of read-only memory chips, a pair of signal lines including a common chip select signal line connected to each said "and" gate, each said "and" gate being actuated to select said chip upon the application of simultaneous signals to said pair of signal lines connected to said "and" gate.

6. A read/write memory system for using a plurality of circuits in integrated circuit read/write memory chips comprising, in combination, a plurality of integrated circuit read/write memory chips, each of said chips having a sub-array of usable circuits and another sub-array of non-usable circuits including at least one none-operating circuit and may include at least one operating circuit interconnected together according to a predetermined interconnection pattern; and selection means for selecting out the portion of each of said chips containing said sub-array of usable circuits to perform a read/write memory system function from the portion of each of said chips containing said another sub-array of non-usable circuits, said selection means comprises at least one memory address input line connected to each of said chips and a selected signal level so as to be continuously energized or clamped off.

7. A method for using a partially good integrated circuit memory chip having a sub-array of usable circuits and another sub-array of non-usable circuits including at least one non-operating circuit and may include at least one operating circuit inter-connected together according to a predetermined interconnection pattern comprising the step of:

electrically separating out the portion of said memory chip containing said sub-array of usable circuits of said chip from the portion of said chip containing said another sub-array of non-usable circuits by connecting at least one memory address input line to a selected signal level so as to be continuously energized or clamped off.

8. A method for testing partially good integrated circuit memory chips comprising the steps of:

testing integrated circuit chips having sub-arrays of usable circuits and sub-arrays of non-usable circuits including at least one non-operating circuit and may include at least one operating circuit interconnected together according to a predetermined pattern to determine the portions of each of said chips containing said sub-arrays of the usable circuits from the portions of said sub-arrays of chips containing said non-usable circuits by connecting at least one memory address input line to a selected signal level so as to be continuously energized or clamped off.

9. A method for using electrically interconnected partially good integrated circuit memory chips having sub-arrays of usable circuits and sub-arrays of non-usable circuits which include at least one non-operating circuit and may include at least one operating circuit interconnected together according to a predetermined interconnection pattern comprising the step of:

electrically connecting at least one memory address line of each of said partially good memory chips to a selected signal level so as to be continuously energized or clamped off to electrically separate out said sub-arrays of usable circuits to provide a fully operative memory storage array.

10. A memory system for using a plurality of storage circuits in an integrated circuit storage chip comprising, in combination, at least one integrated circuit storage chip having a sub-array of usable circuits and another sub-array of non-usable circuits, said another sub-array including at least one non-operating circuit and may include at least one operating circuit interconnected together according to a predetermined interconnection pattern; and selection means for selecting out the portion of said chip containing said sub-array of usable circuits of said chip to perform a memory function from the portion of said chip containing said another sub-array of non-usable circuits, said selection means comprising memory address input line means connected to said chip for selecting out the portion of said chip containing said sub-array of usable circuits.

* * * * *